(12) United States Patent
Bruinsma (10) Patent No.: US 6,994,015 B2
(45) Date of Patent: Feb. 7, 2006

(54) APPARATUS FOR PREPARING COFFEE (75) Inventor: Rodin Enne Bruinsma, Hoogeveen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 156 days.

(21) Appl. No.: 10/665,196

(22) Filed: Sep. 18, 2003

(65) Prior Publication Data

US 2005/0098043 A1   May 12, 2005

(30) Foreign Application Priority Data

Sep. 27, 2002   (EP) .................................. 02079000

(51) Int. Cl.
*A47J 31/40*   (2006.01)
(52) U.S. Cl. ..................... 99/289 R; 99/295; 99/302 R
(58) Field of Classification Search ............. 99/289 R, 99/295, 302 R, 306, 307
See application file for complete search history.

(56) References Cited

U.S. PATENT DOCUMENTS

| | | |
|---|---|---|
| 1,238,042 A | 8/1917 | Moore |
| 1,545,737 A | 7/1925 | Chruden |
| 2,205,290 A | 6/1940 | Herrera ............................ 53/3 |
| D153,826 S | 5/1949 | Robbiati ...................... D44/26 |
| 2,864,640 A | 12/1958 | Mattinson .................... 292/335 |
| 2,968,560 A | 1/1961 | Goros .......................... 99/77.1 |
| 3,034,327 A | 5/1962 | Garmon, Jr. et al. ........... 70/70 |
| 3,127,205 A | 3/1964 | Griffith et al. |
| 3,169,788 A | 2/1965 | Slan ............................. 292/177 |
| 3,209,676 A | 10/1965 | Zimmerman et al. ......... 99/289 |
| 3,270,659 A | 9/1966 | Tavera .......................... 99/295 |
| 3,295,998 A | 1/1967 | Goros .......................... 99/282 |
| 3,384,004 A | 5/1968 | Perlman et al. ............... 99/289 |
| 3,403,617 A | 10/1968 | Lampe ......................... 99/295 |
| 3,407,812 A | 10/1968 | Lucas .......................... 128/214 |
| 3,413,909 A | 12/1968 | Heler ........................... 99/298 |
| 3,450,024 A | 6/1969 | Martin ......................... 99/295 |
| 3,470,812 A | 10/1969 | Levinson ..................... 99/295 |
| D218,191 S | 7/1970 | Tevolitz ...................... D44/26 |
| 3,534,992 A | 10/1970 | Swanson .................... 292/113 |
| 3,589,272 A | 6/1971 | Bouladon et al. ............. 99/295 |
| 3,592,125 A | 7/1971 | Tolmie et al. ................ 99/307 |
| 3,599,557 A | 8/1971 | Leal .......................... 99/302 R |
| 3,607,297 A | 9/1971 | Fasano et al. ................. 99/28 |
| 3,615,673 A | 10/1971 | Black et al. ................... 99/79 |
| 3,645,418 A | 2/1972 | Oberlander ................ 220/55.3 |
| 3,662,674 A | 5/1972 | Clausse ....................... 99/283 |
| 3,756,639 A | 9/1973 | Wilkinson ................... 292/179 |
| 3,824,913 A | 7/1974 | Herman et al. ............... 99/298 |
| 3,878,772 A | 4/1975 | Nordskog .................... 99/295 |
| 3,951,419 A | 4/1976 | Abrahams et al. .......... 277/135 |

(Continued)

FOREIGN PATENT DOCUMENTS

CH   636311   3/1979

(Continued)

*Primary Examiner*—Reginald L. Alexander (57) ABSTRACT

An apparatus for preparing coffee includes a holder provided with an access opening for placing a pouch filled with a product to be extracted into the holder; a cover for closing and releasing the access opening; a clamping arrangement for pressing the holder and cover towards each other when the cover closes off the access opening of the holder; and a closing arrangement for retaining the cover and the clamping arrangement in position when the cover closes off the access opening of the holder. The closing arrangement is mechanically coupled to the clamping arrangement for bringing the clamping arrangement from a non-clamping condition into a clamping condition by manually operating the closing arrangement from a first defined position to a second defined position.

68 Claims, 6 Drawing Sheets

U.S. PATENT DOCUMENTS

| | | | |
|---|---|---|---|
| D239,757 S | 5/1976 | Martin | D7/62 |
| D243,141 S | 1/1977 | Mantelet | D7/41 |
| 4,029,003 A | 6/1977 | Manaresi | 99/295 |
| 4,056,050 A | 11/1977 | Brown | 99/305 |
| 4,096,873 A | 6/1978 | Otzen | 134/135 |
| 4,189,991 A | 2/1980 | Haddad | 99/302 R |
| 4,206,694 A | 6/1980 | Moskowitz et al. | 99/295 |
| 4,211,157 A | 7/1980 | Sakai et al. | 99/306 |
| 4,254,694 A | 3/1981 | Illy | 99/295 |
| 4,273,991 A | 6/1981 | Barnhill | 219/440 |
| 4,280,401 A | 7/1981 | Cleland | 99/295 |
| 4,343,232 A | 8/1982 | Corbier | 99/299 |
| 4,366,920 A | 1/1983 | Greenfield, Jr. et al. | 222/145 |
| 4,389,924 A | 6/1983 | Hoesselbarth | 99/289 |
| 4,389,925 A | 6/1983 | Piana | 99/289 R |
| 4,429,623 A | 2/1984 | Illy | 99/295 |
| 4,457,216 A | 7/1984 | Dremmel | 99/287 |
| 4,464,983 A | 8/1984 | Chappell et al. | 99/312 |
| 4,497,243 A | 2/1985 | Cavalli | 99/323 |
| 4,505,191 A | 3/1985 | Longo | 99/300 |
| 4,512,246 A | 4/1985 | Chappell et al. | 99/312 |
| 4,583,449 A | 4/1986 | Dangel et al. | 99/279 |
| 4,613,745 A | 9/1986 | Marotta et al. | 219/297 |
| 4,644,855 A | 2/1987 | Woolman et al. | 99/280 |
| 4,644,856 A | 2/1987 | Borgmann | 99/295 |
| 4,658,973 A | 4/1987 | Zimmermann | 215/13 R |
| 4,660,466 A | 4/1987 | Fries et al. | 99/294 |
| 4,738,378 A | 4/1988 | Oakley et al. | 222/82 |
| 4,806,375 A | 2/1989 | Favre | 426/433 |
| D300,106 S | 3/1989 | Paulin | D7/309 |
| 4,840,287 A | 6/1989 | Brewer et al. | 220/316 |
| 4,846,052 A | 7/1989 | Favre et al. | 99/295 |
| 4,913,037 A | 4/1990 | Newman | 99/286 |
| 4,941,400 A | 7/1990 | Moore | 99/403 |
| 4,947,738 A | 8/1990 | Eugster | 99/293 |
| 5,012,629 A | 5/1991 | Rehman et al. | 53/453 |
| 5,024,471 A | 6/1991 | Kahl et al. | 292/97 |
| 5,037,015 A | 8/1991 | Collins | 222/472 |
| 5,085,135 A | 2/1992 | Collignon | 99/299 |
| 5,113,752 A | 5/1992 | Brewer | 99/295 |
| 5,118,145 A | 6/1992 | Tucker | 292/158 |
| 5,144,886 A | 9/1992 | Gockelmann et al. | 99/297 |
| 5,146,839 A | 9/1992 | Gockelmann et al. | 99/287 |
| 5,153,016 A | 10/1992 | Gockelmann | 426/433 |
| 5,170,696 A | 12/1992 | Reed | 99/349 |
| RE34,382 E | 9/1993 | Newnan | 222/307 |
| 5,327,815 A | 7/1994 | Fond et al. | 99/295 |
| 5,343,799 A | 9/1994 | Fond | 99/295 |
| 5,372,728 A | 12/1994 | Midden | 210/770 |
| 5,388,502 A | 2/1995 | Hufnagl | 99/295 |
| D356,713 S | 3/1995 | Groover | D7/306 |
| 5,398,595 A | 3/1995 | Fond et al. | 99/295 |
| 5,398,596 A | 3/1995 | Fond | 99/295 |
| 5,454,293 A | 10/1995 | Santi | 99/289 R |
| 5,472,719 A | 12/1995 | Favre | 426/77 |
| 5,473,974 A | 12/1995 | Chang | 99/310 |
| 5,524,791 A | 6/1996 | Credle, Jr. et al. | 222/129.1 |
| 5,526,733 A | 6/1996 | Klawuhn et al. | 99/287 |
| 5,531,152 A | 7/1996 | Gardosi | 99/289 R |
| 5,553,531 A | 9/1996 | Brown | 99/340 |
| 5,582,314 A | 12/1996 | Quinn et al. | 220/326 |
| 5,638,740 A | 6/1997 | Cai | 99/295 |
| 5,638,741 A | 6/1997 | Cisaria | 99/295 |
| D380,335 S | 7/1997 | Hui | D7/309 |
| 5,649,472 A | 7/1997 | Fond et al. | 99/295 |
| 5,732,987 A | 3/1998 | Wright et al. | 292/113 |
| 5,755,149 A | 5/1998 | Blanc et al. | 99/289 T |
| 5,762,987 A | 6/1998 | Fond et al. | 426/433 |
| 5,776,527 A | 7/1998 | Blanc | 426/77 |
| 5,794,519 A | 8/1998 | Fischer | 99/295 |
| 5,803,312 A | 9/1998 | Credle, Jr. et al. | 222/129.1 |
| 5,826,492 A | 10/1998 | Fond et al. | 99/295 |
| 5,829,802 A | 11/1998 | Anderson et al. | 292/336.3 |
| 5,887,760 A | 3/1999 | Johnson | 222/209 |
| 5,901,636 A | 5/1999 | Witziers et al. | 99/283 |
| 5,921,168 A | 7/1999 | Nello | 99/295 |
| 5,927,767 A | 7/1999 | Smith et al. | 292/158 |
| 5,927,768 A | 7/1999 | Dallmann et al. | 292/158 |
| 5,964,142 A | 10/1999 | Tio | 99/289 R |
| 5,967,019 A | 10/1999 | Johnson et al. | 99/323 |
| 5,971,209 A | 10/1999 | Bayless | 222/135 |
| 5,974,949 A | 11/1999 | Weber et al. | 99/289 R |
| 5,992,298 A | 11/1999 | Illy et al. | 99/281 |
| 6,009,792 A | 1/2000 | Kraan | 99/295 |
| 6,026,732 A | 2/2000 | Kollep et al. | 99/295 |
| 6,044,754 A | 4/2000 | Fuentes | 99/295 |
| 6,047,630 A | 4/2000 | Brown et al. | 99/279 |
| 6,050,175 A | 4/2000 | Mirand et al. | 99/279 |
| 6,079,315 A | 6/2000 | Beaulieu et al. | 99/289 R |
| 6,105,809 A | 8/2000 | Yamanaka | 220/326 |
| 6,119,582 A | 9/2000 | Akkerman-Theunisse et al. | 99/323.1 |
| 6,135,511 A | 10/2000 | Smith et al. | 292/156 |
| 6,142,063 A | 11/2000 | Beaulieu et al. | 99/283 |
| 6,182,554 B1 | 2/2001 | Beaulieu et al. | 99/289 R |
| 6,192,786 B1 | 2/2001 | Gasser et al. | 99/319 |
| 6,227,101 B1 | 5/2001 | Rabadi et al. | 99/280 |
| 6,230,457 B1 | 5/2001 | Brautigam | 52/204.69 |
| 6,240,832 B1 | 6/2001 | Schmed et al. | 99/289 R |
| 6,490,966 B2 | 12/2002 | Mariller et al. | 99/289 R |
| 6,505,544 B1 | 1/2003 | Blanc et al. | 99/289 R |
| 6,510,783 B1 | 1/2003 | Basile et al. | 99/289 R |
| 6,536,332 B2 | 3/2003 | Schmed | 99/295 |
| 6,550,370 B2 | 4/2003 | Dam et al. | 99/280 |
| 6,557,458 B1 | 5/2003 | Blanc et al. | 99/280 |
| 6,557,597 B2 | 5/2003 | Riesterer | 141/351 |
| 6,584,888 B2 | 7/2003 | Cortese | 99/289 R |
| 6,595,108 B1 | 7/2003 | Blanc | 99/295 |
| 6,606,938 B2 | 8/2003 | Taylor | 99/295 |
| 6,655,260 B2 | 12/2003 | Lazaris et al. | 99/295 |
| 6,681,960 B2 | 1/2004 | Garman | 222/189.11 |
| 2001/0004070 A1 | 6/2001 | Joergensen | 219/433 |
| 2002/0004070 A1 | 1/2002 | Rudnle et al. | 424/468 |
| 2002/0023542 A1 | 2/2002 | Rosse | 99/275 |
| 2002/0035929 A1 | 3/2002 | Kanba et al. | 99/279 |
| 2002/0059870 A1 | 5/2002 | Walters, Jr. et al. | 99/298 |
| 2002/0078831 A1 | 6/2002 | Cal | 99/295 |
| 2002/0083844 A1 | 7/2002 | Dam et al. | 99/307 |
| 2002/0121198 A1 | 9/2002 | Kollep et al. | 99/279 |
| 2002/0124736 A1 | 9/2002 | Kollep et al. | 99/289 R |
| 2002/0129712 A1 | 9/2002 | Westbrook et al. | 99/279 |
| 2003/0039731 A1 | 2/2003 | Dalton et al. | 426/433 |
| 2003/0051603 A1 | 3/2003 | Yoskim et al. | 99/279 |
| 2003/0056655 A1 | 3/2003 | Kollep et al. | 99/295 |
| 2003/0089245 A1 | 5/2003 | Kollep et al. | 99/495 |
| 2004/0000239 A1 | 1/2004 | Munk | 99/483 |

FOREIGN PATENT DOCUMENTS

| | | |
|---|---|---|
| DE | 517 607 | 2/1931 |
| DE | 538 185 | 11/1931 |
| DE | 1 265 940 | 4/1968 |
| DE | 1 679 107 | 1/1972 |
| DE | 1 007 169 | 3/1976 |
| DE | 1007169 | 3/1976 |
| DE | 3622547 | 4/1987 |
| EP | 0 006 174 | 1/1980 |
| EP | 0 102 125 | 8/1983 |
| EP | 0 151 252 | 12/1984 |
| EP | 0 272 432 | 5/1992 |
| EP | 0 465 877 | 11/1994 |
| EP | 0 521 397 | 5/1996 |
| EP | 0904718 A1 | 3/1999 |
| EP | 1 260 166 | 11/2002 |

| | | | | | | |
|---|---|---|---|---|---|---|
| EP | 0904718 B1 | 4/2003 | | JP | 2002202172 | 7/2002 |
| FR | 1 410 288 | 7/1964 | | WO | WO 94/02059 | 2/1994 |
| FR | 2 552 899 | 10/1984 | | WO | WO9608990 | 3/1996 |
| GB | 939813 | 10/1963 | | WO | WO 98/27853 | 7/1998 |
| GB | 1 383 904 | 2/1975 | | WO | WO 99/11561 | 3/1999 |
| GB | 1 386 764 | 3/1975 | | WO | WO 01/15582 | 3/2001 |
| GB | 1 463 009 | 2/1977 | | WO | WO0115582 | 3/2001 |
| GB | 2 374 069 | 10/2002 | | WO | WO 02/43541 | 6/2002 |
| JP | 60171018 | 9/1985 | | WO | WO 02/49487 | 6/2002 |

APPARATUS FOR PREPARING COFFEE

BACKGROUND

The invention relates to an apparatus for preparing coffee, comprising a holder provided with an access opening for placing a product to be extracted into said holder; a cover for closing and releasing the access opening; clamping means for pressing the holder and cover towards each other when the cover closes off the access opening of the holder and closing means for retaining the cover and the clamping means in position when the cover closes off the access opening of the holder.

Such an apparatus is known from EP 0 904 718. In this known apparatus the holder is mounted in a first housing part and the cover is spring adjustably mounted in a second housing part. To close the apparatus, the second housing part is pivoted towards the first housing part, whereupon the spring will adjust the orientation of the cover so that it can properly engage the holder. Due to this adjustment, clamping means at the inner side of the second housing part engage clamping means at the outer side of the cover, thus establishing a clamping force which presses the cover onto the holder. Subsequently, a clip on the second housing part can be hooked behind a protrusion of the first housing part, to retain the cover and clamping means in the closed position.

A disadvantage of this known apparatus is that the spring and clamping means allow the cover to become misaligned during closure, without a user noticing. The misalignment can for instance be prompted due to a pouch or other filter structure or coffee granulate being misplaced and getting caught between the edges of the cover and the holder or due to too many pouches having been placed in the holder. Due to such misalignment no proper seal will be attained between the holder and cover and consequently, in use, the pressure in the holder will be too low, affecting the quality of the brew.

SUMMARY

It is an object of the invention to provide an apparatus of the above-described type, wherein the risk of operation with the cover not properly aligned is reduced.

To that end, in an apparatus according to the invention the closing means are mechanically coupled to the clamping means for bringing the clamping means from a non-clamping condition into a clamping condition by manually operating the closing means from a first defined position to a second defined position. Such a configuration offers the advantage that a user obtains immediate tactile and visual feedback regarding the state of the clamping means, and hence the state of the cover, from operating the closing means. If, for instance, a force for operating the closing means is considerably lower or higher than usual, this will signal the user that the cover is positioned incorrectly, or at least that something is not working properly. The user may then take appropriate action to remedy the cause. Furthermore, as long as the closing means have not reached one of their two defined end positions, the user is informed that the clamping means have not reached their end position either and the cover is not, or not yet, properly engaged.

The clamping means can for instance comprise one or more cams and mating recesses, which can be brought into and out of engagement with each other by operating the closing means. Preferably the configuration of the cams and recesses is such that they can only be engaged when the cover is properly closing off the holder. Thus, if for whatever reason the cover is not properly aligned, the closing means will not be operable to the closed end position, thereby sending a clear message to the user, both tactile and visual, that something is the matter.

Preferably the cams are at least partly wedge-shaped. This offers the advantage that the clamping force can be gradually built up, while advancing the cams in the recesses, thus facilitating the operation of the closing means.

According to an advantageous embodiment of an apparatus according to the invention, part of the clamping means is statically mounted in a first housing part to which the holder is connected, whereas the mating clamping means are movably mounted in a second housing part to which the cover is connected. Preferably, said movable clamping means are mounted on a single slider, which slider is movably connected to the second housing part. In that way, by displacing, e.g. rotating and/or translating the slider, all movable clamping means can be simultaneously brought into engagement with the static clamping means. Since only a single slider will have to be operated, the closing means can be of a simple, robust construction and will be easy to operate. Furthermore, the construction will have a high sensitivity to detecting misalignment of the cover, for if only one pair of co-operating clamping means cannot be properly engaged, the complete slider will not attain its engaged position, which again will be communicated to the user by the position of the closing means.

The cover can either be connected to the slider and, together with the slider and the clamping means, be slid into the closing position, or it can be connected to the second housing part, separately from the slider. In the latter case, the cover can be clamped onto the holder by means of the slider pressing directly onto the cover, or indirectly, by means of the second housing part, which itself is being clamped onto the first housing part.

In a further advantageous embodiment, the clamping means are spaced evenly along the access opening of the holder, at least in the clamped condition. As a result, the clamping force will be evenly distributed over the cover, in particularly around its periphery, resulting in a good, reliable seal. The clamping means can for instance be arranged around the access opening in a triangle, preferably an equilateral triangle. If so, the widest part of the triangle, that is the base thereof, preferably faces a front side of the apparatus so that the accessibility of the holder is not hampered.

According to yet a further preferred embodiment, the closing means for operating the clamping means include a toggle joint lever. By applying such a toggle joint lever the force needed for operating the slider and bringing the clamping means into engagement can be kept relatively low. Although the operating force will be low, this will still contain sufficient information regarding the state of the clamping means and cover. Hence, ease of operation can be increased, without compromising the feedback function of the closing means.

In a highly preferred embodiment, the closing means furthermore comprise a spring, which helps return the closing means to either one of its two defined end positions, thereby communicating to the user whether the closure of the holder has been successful or not. Preferably, the design of the toggle joint lever and spring action is chosen such that the movement of the closing means between said two defined positions corresponds to a natural sense for opening and closing the apparatus.

The above and other advantageous embodiments of the invention are set forth in the dependent claims.

BRIEF DESCRIPTION OF THE DRAWINGS

To explain the invention, exemplary embodiments thereof will hereinafter be described with reference to the accompanying drawings, wherein.

DETAILED DESCRIPTION

In this description, the same or corresponding parts have the same or corresponding reference numerals.

Figure 1:
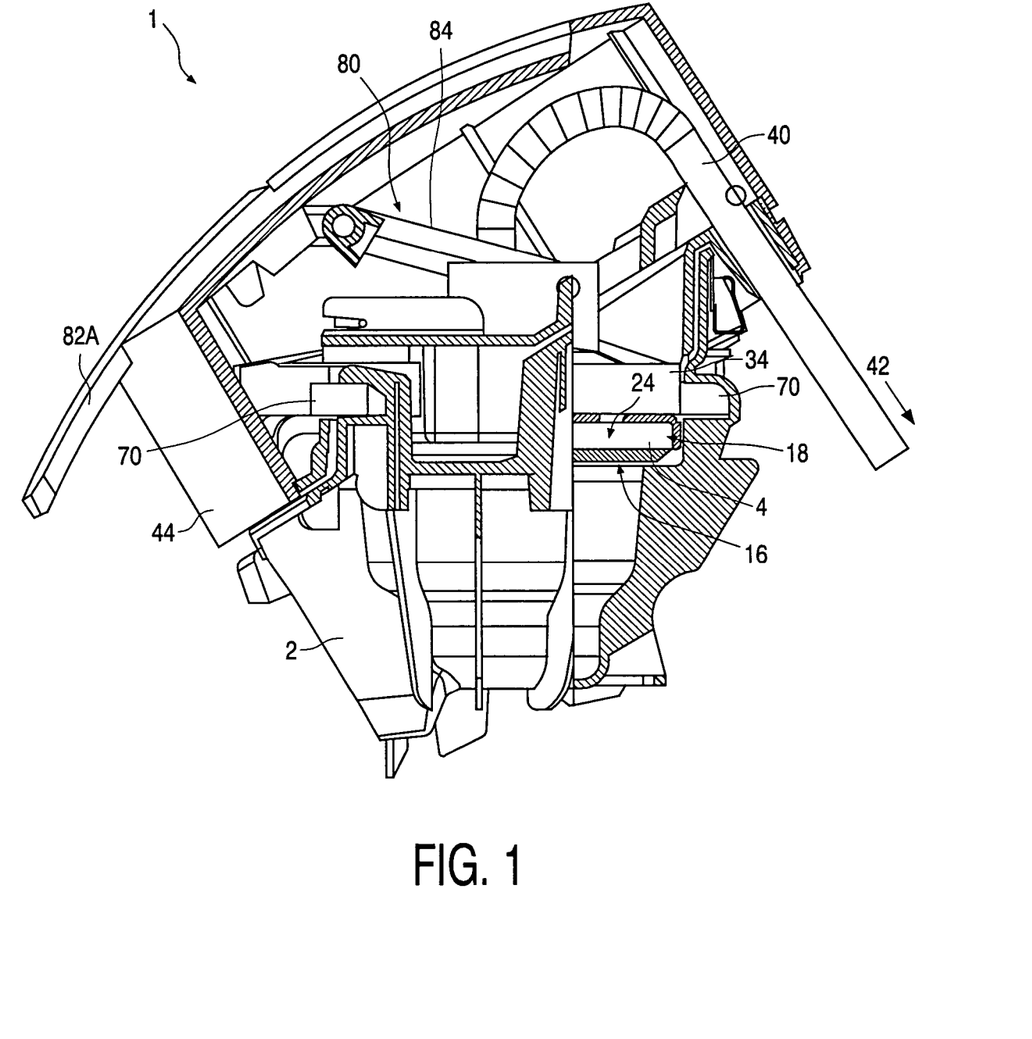
FIG. 1 shows a cross section of the apparatus according to the invention, in the closed condition.
Figure 2:
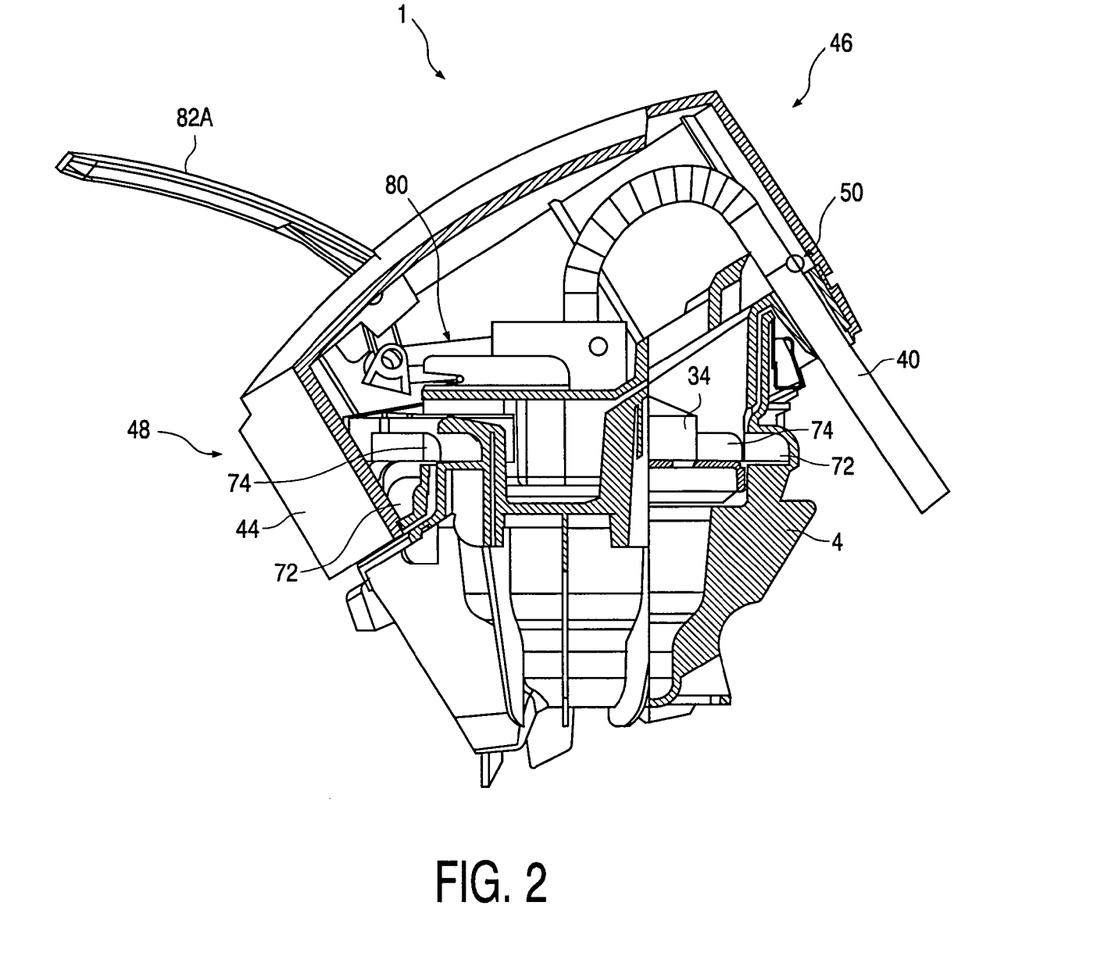
FIG. 2 shows a cross section of the apparatus according to FIG. 1, in the partly opened condition.
Figure 3:
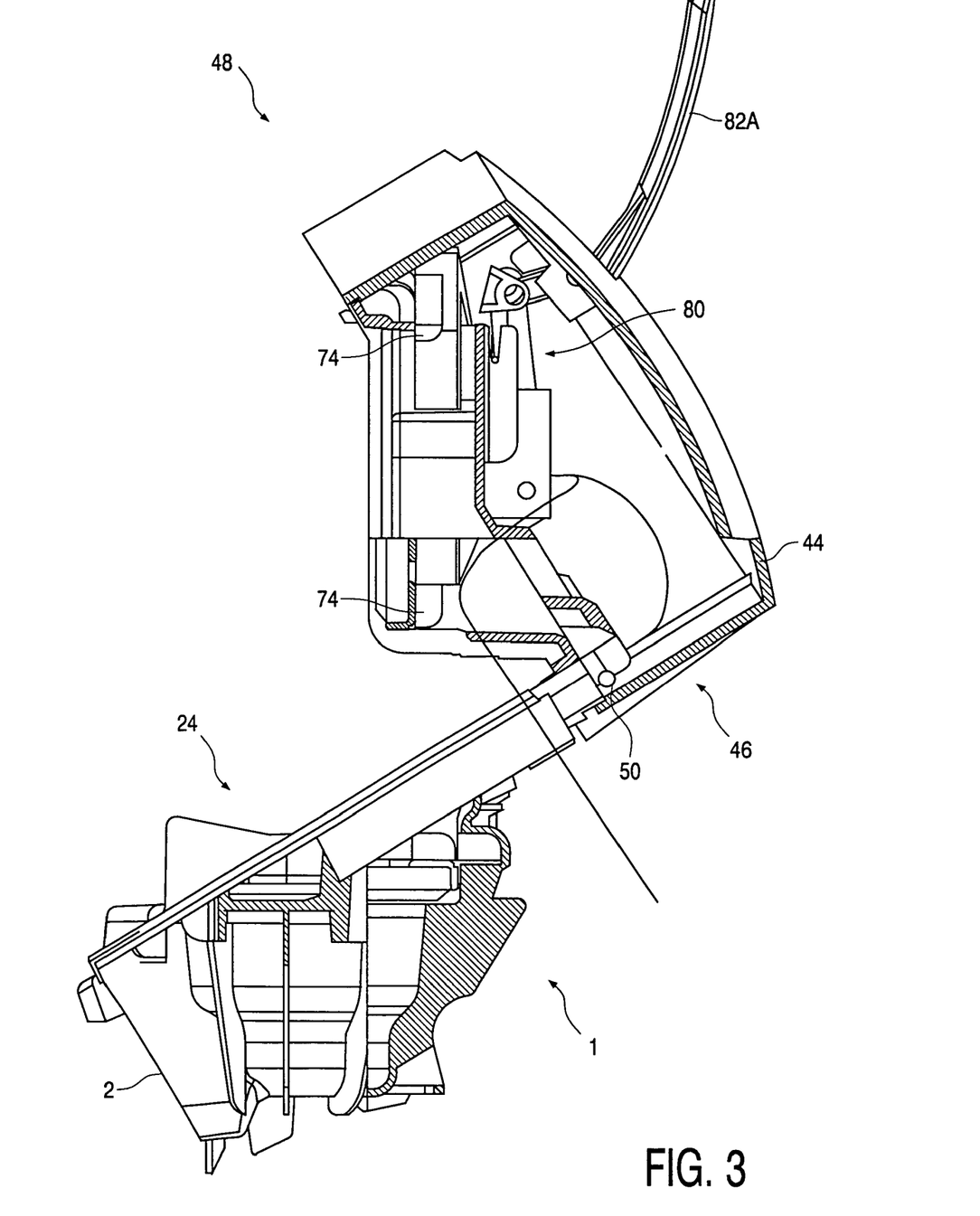
FIG. 3 shows a cross section of the apparatus according to FIG. 1, in the completely opened condition.

FIGS. 1–3 show an apparatus 1 for preparing coffee, comprising a first housing part 2, in which a holder 4 has been mounted and a second housing part 44, in which a cover 34 has been mounted.

The holder 4 is of a cup-shaped design, comprising a bottom 16 and an upright, circumferential sidewall 18, connected to the bottom 16. At its upper end, the holder 4 is provided with an access opening 24, for receiving a product to be extracted, for instance a pouch, made of filter material and filled with for instance ground coffee. Provided in the bottom 16 of the holder 4 is at least one outflow opening (not visible in the Figures) for discharging extracted liquid.

The cover 34 is designed to accurately close off the access opening 24 of the holder 4. At its upper side, an inflow opening is provided through which water is passed into the holder 4, and onto the product to be extracted. To that end, the inflow opening is connected to a hot water supply 42 (not shown), via a liquid duct 40. Furthermore, the side of the cover 34 facing the holder 4 can be equipped with a sealing ring, which in use co-operates with the holder 4 to ensure a proper liquid seal between the holder 4 and the cover 34.

The second housing part 44 is adjacent one end connected to the first housing part 2 for rotation around a rotation axis 50 between a first position, in which the access opening 24 is closed off by the cover 34 (as illustrated in FIGS. 1 and 2) and a second position in which the access opening 24 of the holder 4 is cleared (as shown in FIG. 3).

The apparatus 1 furthermore comprises clamping means 70 for pressing the cover 34 against the holder 4 when it closes off the access opening 24 of the holder 4, and closing means 80 for maintaining the cover 34 and the clamping means 70 in the aforementioned position.

Figure 4A:
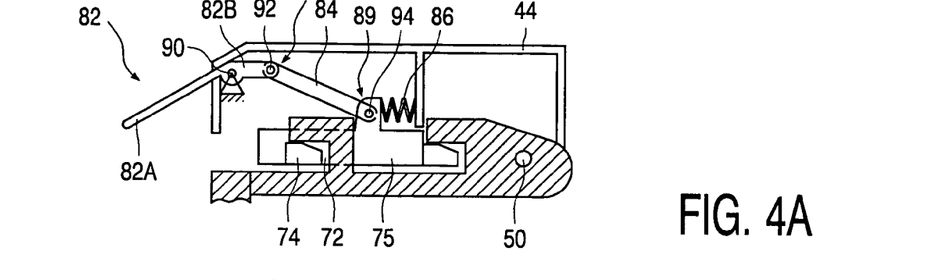
FIG. 4 shows schematically, in cross section, in four subsequent steps the working of the closing and clamping means according to the invention, during opening and closing of an apparatus according to FIG. 1.
Figure 4B:
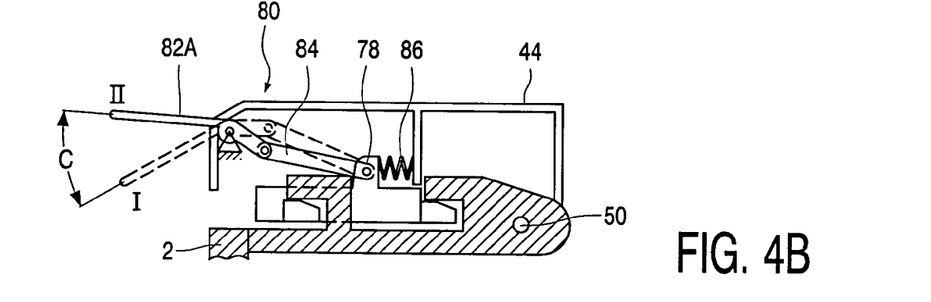
Figure 4C:
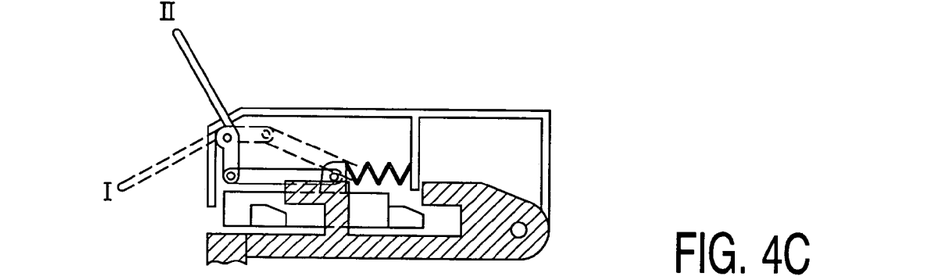
Figure 4D:
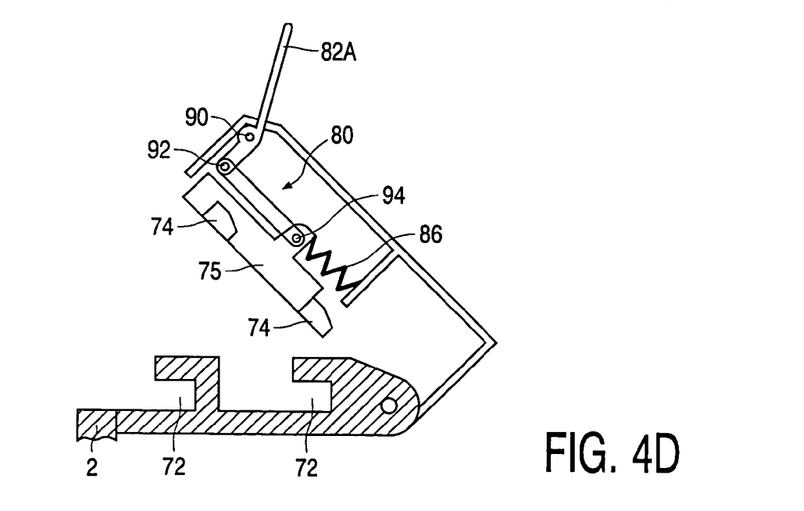
Figure 5:
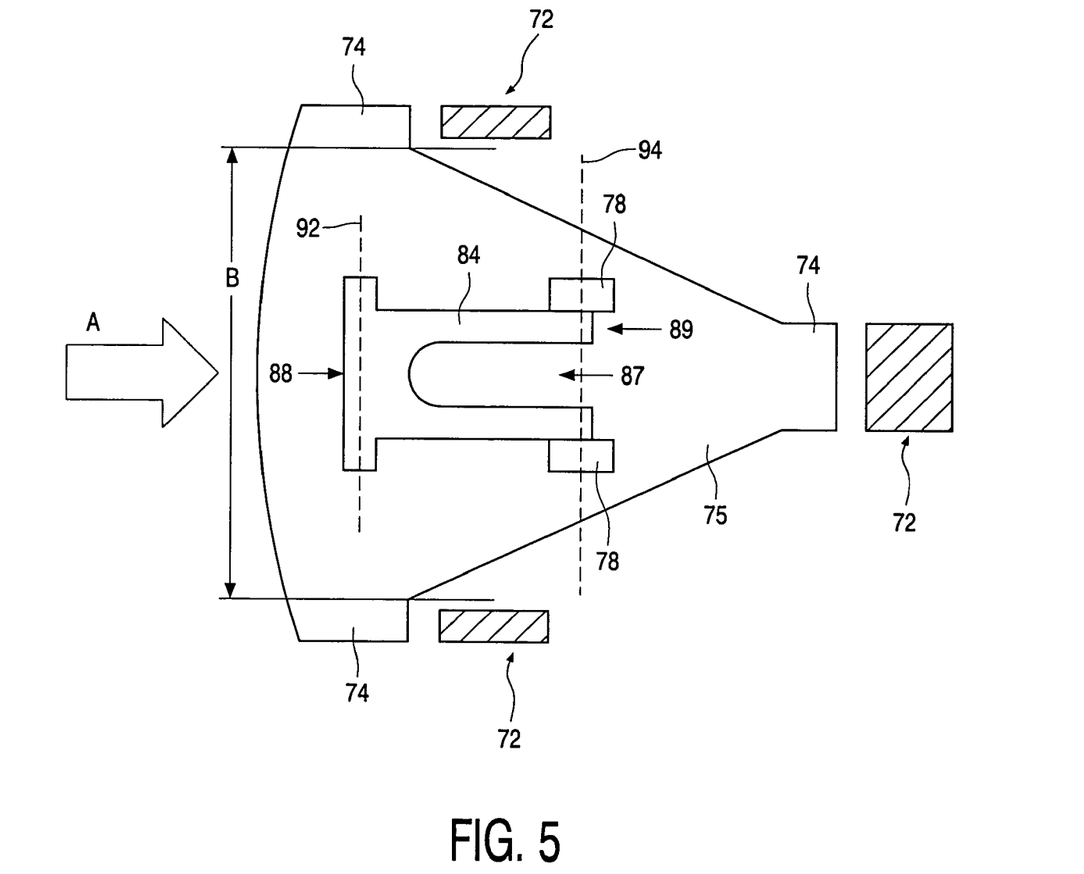
FIG. 5 shows in a plan view a preferred embodiment of a slider according to the invention.

As is best seen in FIGS. 2, 4 and 5, the clamping means 70 comprise three sets of recesses 72 and mating cams 74. The recesses 72 are provided in the first housing part 2, spaced in a triangle around the access opening 24 of the holder 4. The cams 74 are provided on a substantially triangular slider 75 (see FIGS. 4 and 5), adjacent the three corners thereof. The slider 75 is movably mounted in the second housing part 44, and can be operated by the closing means 80, in a way to be described in more detail below, between a first and a second position, in which the cams 74 are respectively in and out of engagement with the recesses 72.

Thanks to the triangular configuration the clamping means 70 are spaced at more or less regular angles along the periphery of the access opening 24. Consequently, the clamping force will be evenly distributed along the edge of the cover 34, resulting in a reliable seal. Of course, more cams and mating recesses can be applied within the scope of the invention. These cams and recesses may be spaced differently around the access opening. Also, the position of the cams and recesses can be interchanged, that is the cams 74 can be mounted in the first housing part 2, whereas the recesses 72 can be provided in the slider 75.

In case the triangular configuration is applied, the triangle is preferably oriented in such a way that the widest part thereof, that is base B, faces the front side of the apparatus 1 via which products are placed into or removed from the holder 4, as indicated by arrow A in FIG. 5. In this way, the accessibility of the holder 4 need hardly be affected.

Preferably, the cams 74 are of a wedge-shaped design (as illustrated in FIGS. 1 and 2). This facilitates introducing the cams 74 into the recesses 72 and enables the clamping force to be built up gradually while the cams 74 enter the recesses 72. Of course, other shapes are possible and understood to fall within the scope of protection.

Figure 6:
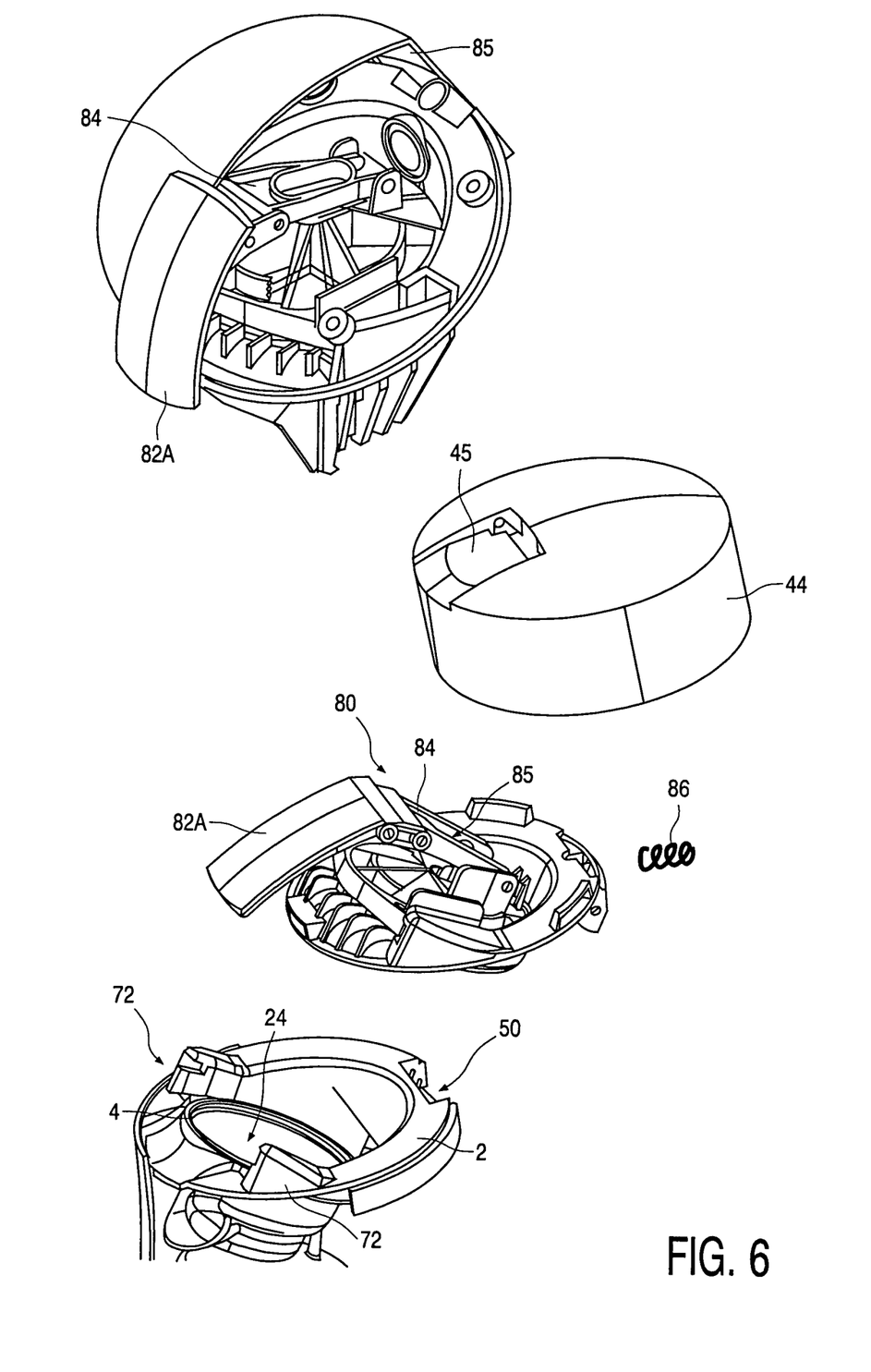
FIG. 6 shows in an exploded and assembled view the various parts of a closing and clamping configuration according to an embodiment of the present invention.

The closing means 80 for operating the slider 75 comprise a lever 82, a push rod 84, and a spring 86. The lever 82 has an angular shape and, near its angle, is rotatably connected to the second housing part 44, for rotation around a first rotation axis 90. A first end 82A of the lever 82 extends from the rotation axis 90 to outside the second housing part 44, through an opening 45 (see FIG. 6). The second end 82B of the lever 82 is connected to the push rod 84, i.e. to a first end 88 thereof, for rotation around a second rotation axis 92. This second rotation axis 92 extends substantially parallel to the first rotation axis 90. The push rod 84 is connected, near its other end 89, to the slider 75, more specifically to two mounting brackets 78 extending upward from the slider 75, for rotation around a third rotation axis 94. This third rotation axis 94 extends substantially parallel to the first and the second rotation axis 90, 92. In the push rod 84 a slot 87 is provided, which extends from the second end 89, between the mounting brackets 78, in the longitudinal direction. This slot 87 provides a passage for the liquid duct 40 of the cover 34, which extends at least partially below the slider 75 and can be connected either to said slider 75 or to the second housing part 44.

The lever 82 and push rod 84 together form a toggle joint lever assembly 85, with which the slider 75 can be operated from a non-clamping to a clamping position, with a relatively low operating force. The closing means 80 furthermore comprise a spring 86, which at one end is connected to the slider 75 or the push rod 84, near the third rotation axis 94, and at an opposite end is connected to the second housing part 44. The spring 86 turns the toggle joint into a snap mechanism, and helps a user operate the lever 82 between its defined end positions I, II.

The operation of the closing and clamping means 80, 70 is as follows. In a closed position, illustrated in FIG. 4A, the cover 34 closes off the opening 24 and is clamped onto the holder 4 by means of the slider 75, which is engaged into the recesses 72 by means of the cams 74. In this position, the spring 86 is slightly compressed and exerts a force on the push rod 84, which tends to rotate the lever 82 counterclockwise, to a first defined end position I, in which the second end 82B of the lever 82 abuts the inner side of the second housing part 44 and the first end of the lever 82A extends downward, against part of the outer side of the second housing part 44 (see FIG. 4A). A user can see from this first lever position I that the cover 34 is properly closed.

To open the apparatus I and lift the cover 34 from the holder 4, the first end 82A of the lever 82 is rotated clockwise, around the first rotation axis 90 in the direction of arrow C (see FIG. 4B). Consequently, the push rod 84 is rotated counterclockwise around the third rotation axis 94, against the force of the spring 86. The spring 86 is compressed until the lever 82 passes the point where the second end 82B and the push rod 84 are aligned. The spring 86 then recovers from compression and expands, thereby pushing the slider 75 sideward and disengaging the cams 74 from the recesses 72. Simultaneously, the second end of the lever 82B is rotated further downward around the first rotation axis 90 and the first end 82A is rotated upward, away from the second housing part 44 to a second defined end position II (see FIG. 4C). In this position the push rod 84 extends about parallel to the slider 75 and the spring 86 is not compressed. In this position the upward extending lever 82 signals to the user that the cover 34 is now unclamped. For gaining access to the holder 4, the user may proceed by rotating the second housing part 44 around its rotation axis 50, away from the first housing part 2, thus lifting the cover 34 from the holder 4 (as shown in FIG. 4D). After placing a product to be extracted into the holder 4, the apparatus 1 can be closed by going through the above-described steps in reversed order. Thus, the lever end 82A is rotated downwards, against the spring force, till the spring 86 snaps and rotates the lever 82 further till the second lever end 82B abuts the inner side of the second housing part 44 and locks the lever 82 and slider 75 against further movement.

The closing and clamping means 80, 70 as described offer several advantages. For instance, because the clamping means 70 are brought into a clamping condition by the user himself instead of by a spring, the user obtains immediate feedback on the status of the cover 34 from the force needed to operate the closing means. Preferably the clamping means 72, 74 are dimensioned such that if the cover 34 is near its closed position but does not properly seal the holder 4, the cams 74 cannot be brought into engagement with the recesses 72. The lever 82 will then retain its second end position II or at least not reach its first end position I, thus indicating to the user that no proper closure could be achieved. The user may then take appropriate action to remedy the cause, for instance by reopening the second housing part 44 and rearranging the pouch.

Furthermore, the toggle joint design of the closing means allows the clamping means to be operated with relatively little effort, without undoing the feedback function of the closing means. Thanks to the snap mechanism the first lever end 82A will at all times be returned to one of its two defined end positions I, II, to provide the user with reliable visual information about the state of the cover 34. Preferably, the design of the snap mechanism is such that the movement between the first and second position of the lever corresponds to a natural movement for opening or closing the apparatus 1.

Although not shown, the slider 75 and second housing part 44 can be equipped with co-operating guiding means, for guiding the slider 75 during its movement between the clamping and non-clamping position and support the slider 75 in retaining a preferred orientation with regard to the access opening 24.

The invention is not in any way limited to the embodiments described hereinbefore.

For instance, the slider can be designed to surround the cover or overlap the cover, at least partly, in the clamped condition. Also, the cover and the slider can be connected to the second housing part jointly or separately. The slider and the closing means can be arranged for rotating the slider around a rotation axis extending substantially perpendicularly to the plane of the slider or extending substantially parallel to said plane. Furthermore, the engaging movement of the slider can be a combination of a rotational and a linear movement. The cams and recesses may differ in number, shape and position from the ones shown in the accompanying drawing.

Such variants are understood to fall within the scope of the invention.

What is claimed is:

1. An apparatus for preparing coffee, comprising
a holder provided with an access opening for placing a product to be extracted into said holder;
a cover for closing and releasing the access opening;
clamping means for pressing the cover towards the holder when the cover closes off the access opening of the holder; and
closing means for retaining the cover and the clamping means in position when the cover closes off the access opening of the holder, the closing means being mechanically coupled to the clamping means for bringing the clamping means from a non-clamping condition into a clamping condition by manually operating the closing means from a first defined position to a second defined position,
the clamping means comprising a series of recesses and a series of mating cams, wherein one of these series is statically mounted in a first housing part to which the holder is connected, and the other series is movably mounted in a second housing part to which the cover is connected.

2. An apparatus according to claim 1, wherein the clamping means comprise at least one recess and at least one mating cam, which can be brought into and out of engagement with each other by operating the closing means between the first and the second position.

3. An apparatus according to claim 2, wherein the cam and the mating recess are located and dimensioned in such way that the cam can only engage the recess when the cover closes off the holder properly.

4. An apparatus according to claim 2, wherein the cam and the recess are wedge-shaped, so that a clamping force can be gradually built up.

5. An apparatus according to claim 1, wherein the series of recesses and the series of mating cams are evenly spaced along the periphery of the access opening of the holder, at least in the clamped condition.

6. An apparatus according to claim 1, wherein the series of recesses and the series of mating cams are arranged in a triangle around the access opening of the holder, wherein a base of the triangle faces a front side of the apparatus via which the holder is accessible when the apparatus is opened.

7. An apparatus according to claim 1, wherein the series of movably mounted clamping means is mounted on a slider, which slider is movably connected to the second housing part and mechanically coupled to the closing means.

8. An apparatus according to claim 7, wherein the slider is translatably mounted in the second housing part.

9. An apparatus according to claim 7, wherein the slider is rotatably mounted in the second housing part.

10. An apparatus according to claim 7, wherein the cover is connected to the slider, and operated together with said slider and clamping means by the closing means.

11. An apparatus according to claim 7, wherein the closing means comprise a toggle joint lever assembly, including an angular shaped lever and a push rod, the lever being connected to the second housing part, for rotation around a first rotation axis, the lever furthermore being connected near one end to the push rod, for rotation around a second rotation axis, the push rod being with its other end connected to the slider, for rotation around a third rotation axis, such that by operating the free end of the lever between a first position and a second position, the slider is displaced between a first position wherein the clamping means are not engaged and a second position wherein the clamping means are engaged.

12. An apparatus according to claim 11, wherein the closing means comprise a spring, which returns the lever to one of its two positions.

13. An apparatus according to claim 12, wherein the spring extends between the second housing part and the slider or push rod, near the third rotation axis, for forming an overcenter snap link.

14. An apparatus for preparing coffee, the apparatus comprising:
a first housing part mounting a holder, the holder for placing a product to be used in preparing the coffee;
a liftable second housing part mounted to a cover, the cover for closing the holder and including an opening for delivering water into the holder when the cover is closing the holder; and
a clamping arrangement for pressing the cover against the holder, the clamping arrangement including:
a slider mounted in the second housing part and slidably moveable between a non-clamping position and a clamping position;
a first cam provided on the slider; and
a first cam receiving recess provided on the first housing part for receiving the first cam when the slider is moved to the clamping position.

15. An apparatus for preparing coffee, the apparatus comprising:
a first housing part mounting a holder, the holder for placing a product to be used in preparing the coffee;
a liftable second housing part mounted to a cover, the cover for closing the holder and including an opening for delivering water into the holder when the cover is closing the holder; and
a clamping arrangement for pressing the cover against the holder, the clamping arrangement including:
a slider mounted in the second housing part and slidably moveable between a non-clamping position and a clamping position;
a first cam provided on one of the slider and the first housing part; and
a first cam receiving recess provided on the other one of the slider and the first housing part not having the first cam for receiving the first cam when the slider is moved to the clamping position;
second and third cams provided on the one of the slider and the first housing part having the first cam; and
second and third cam receiving recesses provided on the other one of the slider and the first housing part having the first cam receiving recess.

16. The apparatus according to claim 15, wherein the first, second and third cams each comprises a wedge shape.

17. The apparatus according to claim 15, wherein the cams are spaced in a triangular relationship and the cam receiving recesses are spaced in a corresponding triangular relationship.

18. The apparatus according to claim 15, wherein the cams are provided on the slider and the cam recesses are provided on the first housing part.

19. The apparatus according to claim 15, wherein the cams are provided on the first housing part and the cam recesses are provided on the slider.

20. The apparatus according to claim 15, wherein the first cam is provided on the first housing part and the first cam recess is provided on the slider.

21. The apparatus according to claim 14, further comprising a closing arrangement for operating the clamping arrangement between the non-clamping position and a clamping position.

22. The apparatus according to claim 14, wherein the first cam comprises a wedge shape.

23. The apparatus according to claim 21, wherein the closing arrangement comprises a toggle joint assembly.

24. An apparatus for preparing coffee, the apparatus comprising:
a first housing part mounting a holder, the holder for placing a product to be used in preparing the coffee;
a liftable second housing part mounted to a cover, the cover for closing the holder and including an opening for delivering water into the holder when the cover is closing the holder;
a clamping arrangement for pressing the cover against the holder, the clamping arrangement including:
a slider mounted in the second housing part and slidably moveable between a non-clamping position and a clamping position;
a first cam provided on one of the slider and the first housing part; and
a first cam receiving recess provided on the other one of the slider and the first housing part not having the first cam for receiving the first cam when the slider is moved to the clamping position;
a closing arrangement for operating the clamping arrangement between the non-clamping position and a clamping position, the closing arrangement comprising a toggle joint assembly, the toggle joint assembly including a lever connected to the second housing part and a push rod connecting the lever to the slider.

25. The apparatus according to claim 24, wherein the push rod includes a slot.

26. The apparatus according to claim 24, wherein the closing arrangement further comprises a spring having one end connected to one of the slider and the rod, and a second end connected to the second housing part.

27. An apparatus for preparing coffee, the apparatus comprising:
a holder for placing a product to be used in preparing the coffee;
a housing part mounting the holder;
a liftable cover for closing the holder, the cover including an opening for delivering water into the holder when the cover is closing the holder; and
a clamping arrangement for pressing the cover against the holder, the clamping arrangement including a slider mounted over the cover and slidably moveable between a non-clamping position and a clamping position, a first cam provided on one of the slider and the housing part;

and a first cam receiving recess provided on the other one of the slider and the housing part not having the first cam.

28. The apparatus according to claim 27, wherein the first cam comprises a wedge shape.

29. The apparatus according to claim 27, further comprising:
second and third cams provided on the one of the slider and the housing part having the first cam; and
second and third cam receiving recesses provided on the other one of the slider and the housing part having the first cam receiving recess.

30. The apparatus according to claim 29, wherein the first, second and third cams each comprises a wedge shape.

31. The apparatus according to claim 29, wherein the cams are spaced in a triangular relationship and the cam receiving recesses are spaced in a corresponding triangular relationship.

32. The apparatus according to claim 29, wherein the cams are provided on the slider and the cam recesses are provided on the housing part.

33. The apparatus according to claim 29, wherein the cams are provided on the housing part and the cam recesses are provided on the slider.

34. The apparatus according to claim 27, wherein the first cam is provided on the slider and the first cam recess is provided on the housing part.

35. The apparatus according to claim 27, wherein the first cam is provided on the housing part and the first cam recess is provided on the slider.

36. The apparatus according to claim 27, further comprising a closing arrangement for operating the clamping arrangement between the non-clamping position and a clamping position.

37. An apparatus for preparing coffee, the apparatus comprising:
a holder for placing a product to be used in preparing the coffee;
a liftable cover for closing the holder, the cover including an opening for delivering water into the holder when the cover is closing the holder; and
a clamping arrangement for pressing the cover against the holder, the clamping arrangement including a slider mounted over the cover and slidably moveable between a non-clamping position and a clamping position
a closing arrangement for operating the clamping arrangement between the non-clamping position and a clamping position, the closing arrangement comprising a toggle joint assembly.

38. The apparatus according to claim 37, wherein the toggle joint assembly includes a lever and a push rod connecting the lever to the slider.

39. The apparatus according to claim 38, wherein the push rod includes a slot.

40. The apparatus according to claim 38, wherein the closing arrangement further comprises a spring having one end connected to one of the slider and the rod.

41. A liftable housing part for a coffee preparation apparatus, the housing part comprising:
a cover for closing a coffee preparation product holder, the cover including an opening for delivering water into the holder when the cover is closing the holder; and
a clamping arrangement for pressing the cover against the holder, the clamping arrangement including a slider mounted over the cover and slidably moveable between a non-clamping position and a clamping position, a first cam provided on one of the slider and a housing part of the coffee preparation apparatus, and a first cam receiving recess provided on the other one of the slider and the housing part of the coffee preparation apparatus not having the first cam.

42. The liftable housing part according to claim 41, wherein the first cam comprises a wedge shape.

43. The liftable housing part according to claim 41, further comprising:
second and third cams provided on the one of the slider and the housing part of the coffee preparation apparatus having the first cam; and
second and third cam receiving recesses provided on the other one of the slider and the housing part of the coffee preparation apparatus having the first cam receiving recess.

44. The liftable housing part according to claim 43, wherein the first, second and third cams each comprises a wedge shape.

45. The liftable housing part according to claim 43, wherein the cams are spaced in a triangular relationship and the cam receiving recesses are spaced in a corresponding triangular relationship.

46. The liftable housing part according to claim 43, wherein the cams are provided on the slider and the cam recesses are provided on the housing part of the coffee preparation apparatus.

47. The liftable housing part according to claim 43, wherein the cams are provided on the housing part of the coffee preparation apparatus and the cam recesses are provided on the slider.

48. The liftable housing part according to claim 41, wherein the first cam is provided on the slider and the first cam recess is provided on the housing part of the coffee preparation apparatus.

49. The liftable housing part according to claim 41, wherein the first cam is provided on the housing part of the coffee preparation apparatus and the first cam recess is provided on the slider.

50. The liftable housing part according to claim 41, further comprising a closing arrangement for operating the clamping arrangement between the non-clamping position and a clamping position.

51. A liftable housing part for a coffee preparation apparatus, the housing part comprising:
a cover for closing a coffee preparation product holder, the cover including an opening for delivering water into the holder when the cover is closing the holder;
a clamping arrangement for pressing the cover against the holder, the clamping arrangement including a slider mounted over the cover and slidably moveable between a non-clamping position and a clamping position; and
a closing arrangement for operating the clamping arrangement between the non-clamping position and a clamping position, the closing arrangement comprising a toggle joint assembly.

52. The liftable housing part according to claim 51, wherein the toggle joint assembly includes a lever and a push rod connecting the lever to the slider.

53. The liftable housing part according to claim 52, wherein the push rod includes a slot.

54. The liftable housing part according to claim 52, wherein the closing arrangement further comprises a spring having one end connected to one of the slider and the rod and a second end connected to the liftable housing part.

55. An apparatus for ensuring a liquid seal between a liftable cover of a coffee preparation device and a holder of the coffee preparation device that holds a product for preparing coffee, the apparatus comprising a clamping arrangement for pressing the cover against the holder to effect the liquid seal, the clamping arrangement including a slider mounted over the cover and slidably moveable between a non-clamping position and a clamping position, a first cam provided on one of the slider and a housing part of the coffee preparation device, and a first cam receiving recess provided on the other one of the slider and the housing part of the coffee preparation device not having the first cam.

56. The apparatus according to claim 55, wherein the first cam comprises a wedge shape.

57. The apparatus according to claim 55, further comprising:
 second and third cams provided on the one of the slider and the housing part of the coffee preparation device having the first cam; and
 second and third cam receiving recesses provided on the other one of the slider and the housing part of the coffee preparation device having the first cam receiving recess.

58. The apparatus according to claim 57, wherein the first, second and third cams each comprises a wedge shape.

59. The apparatus according to claim 57, wherein the cams are spaced in a triangular relationship and the cam receiving recesses are spaced in a corresponding triangular relationship.

60. The apparatus according to claim 57, wherein the cams are provided on the slider and the cam recesses are provided on the housing part of the coffee preparation device.

61. The apparatus according to claim 57, wherein the cams are provided on the housing part of the coffee preparation device and the cam recesses are provided on the slider.

62. The apparatus according to claim 55, wherein the first cam is provided on the slider and the first cam recess is provided on the housing part of the coffee preparation device.

63. The apparatus according to claim 55, wherein the first cam is provided on the housing part of the coffee preparation device and the first cam recess is provided on the slider.

64. The apparatus according to claim 55, further comprising a closing arrangement for operating the clamping arrangement between the non-clamping position and a clamping position.

65. An apparatus for ensuring a liquid seal between a liftable cover of a coffee preparation device and a holder of the coffee preparation device that holds a product for preparing coffee, the apparatus comprising:
 a clamping arrangement for pressing the cover against the holder to effect the liquid seal, the clamping arrangement comprising a slider mounted over the cover and slidably moveable between a non-clamping position and a clamping position; and
 a closing arrangement for operating the clamping arrangement between the non-clamping position and a clamping position, the closing arrangement comprising a toggle joint assembly.

66. The apparatus according to claim 65, wherein the toggle joint assembly includes a lever and a push rod connecting the lever to the slider.

67. The apparatus according to claim 65, wherein the push rod includes a slot.

68. The apparatus according to claim 66, wherein the closing arrangement further comprises a spring having one end connected to one of the slider and the rod and a second end connected to a liftable housing part of the coffee preparation device.

* * * * *